Feb. 2, 1960 C. E. BARKALOW 2,923,161
VERTICAL GYRO ERECTION MECHANISM
Filed Dec. 9, 1957 2 Sheets-Sheet 1

*INVENTOR.*
CLARE E. BARKALOW

Feb. 2, 1960    C. E. BARKALOW    2,923,161
VERTICAL GYRO ERECTION MECHANISM
Filed Dec. 9, 1957    2 Sheets-Sheet 2

INVENTOR.
CLARE E. BARKALOW

United States Patent Office 2,923,161
Patented Feb. 2, 1960

2,923,161

VERTICAL GYRO ERECTION MECHANISM

Clare E. Barkalow, Comstock Park, Mich., assignor to Lear, Incorporated

Application December 9, 1957, Serial No. 701,520

9 Claims. (Cl. 74—5.43)

This invention relates to a device for erecting gyroscopic apparatus with the spin axis of the gyro rotor vertical.

Various mechanisms have been devised in the past for use as gyroscopic devices wherein the gyro wheel was rotatably mounted within a hermetically sealed case and structure was provided for vertically erecting the gyro. Gyroscopic devices have also been designed wherein the gyro wheel was vertically erected by a jet stream from a nozzle impinged against a partially spherical surface of a member mounted for rotation with the gyro wheel. Such structure is illustrated in U.S. Patent No. 2,225,568, issued December 17, 1940, to P. Obermeier.

The requirements of extreme accuracy of gyroscopic devices indicate the need for mounting the gyro wheel for rotation within a hermetically sealed case which in turn is supported by one or more gimbals. In some instances, it is desired to vertically erect the spin axis of the gyro wheel by a jet stream of air, fluid, or other mass which may be forced through a nozzle. It is apparent that if the gyro wheel is completely inclosed within a hermetically sealed case, the jet stream cannot be impinged against a member rotating with the wheel and fastened to it.

Another problem encountered has been that of mounting the gimbals and the entire gyroscopic device within an outer hermetically sealed container while simultaneously providing a jet stream for vertically erecting the gyro wheel.

The present invention has for one of its objects the overcoming of the heretofore mentioned problems and others.

A further object of the present invention is to provide a structure in which a jet stream may be used to vertically erect a gyro wheel hermetically sealed within a case.

A further object of the invention is to provide a gyroscopic device comprising a vertical erection device inclosed in a hermetically sealed housing and a gyro wheel hermetically sealed within a case within that housing.

A still further object of the invention is to provide structure for vertically erecting a gyro wheel hermetically sealed in a case by means of a jet stream consisting of air, gas, fluids or other masses which may be propelled through the jet stream and which are contained within a hermetically sealed housing, the jet stream being controlled from outside of the housing.

Another object of the invention is to provide a hermetically sealed case for inclosing and rotatably supporting a gyro wheel with external blades arranged about the spin axis of the gyro wheel and structure for directing a jet stream against said blades to cause vertical erecting of the spin axis.

Other objects and a fuller understanding of the invention will become apparent from the following description of a preferred embodiment of the invention when taken in conjunction with the attached drawings in which.

Figure 1:
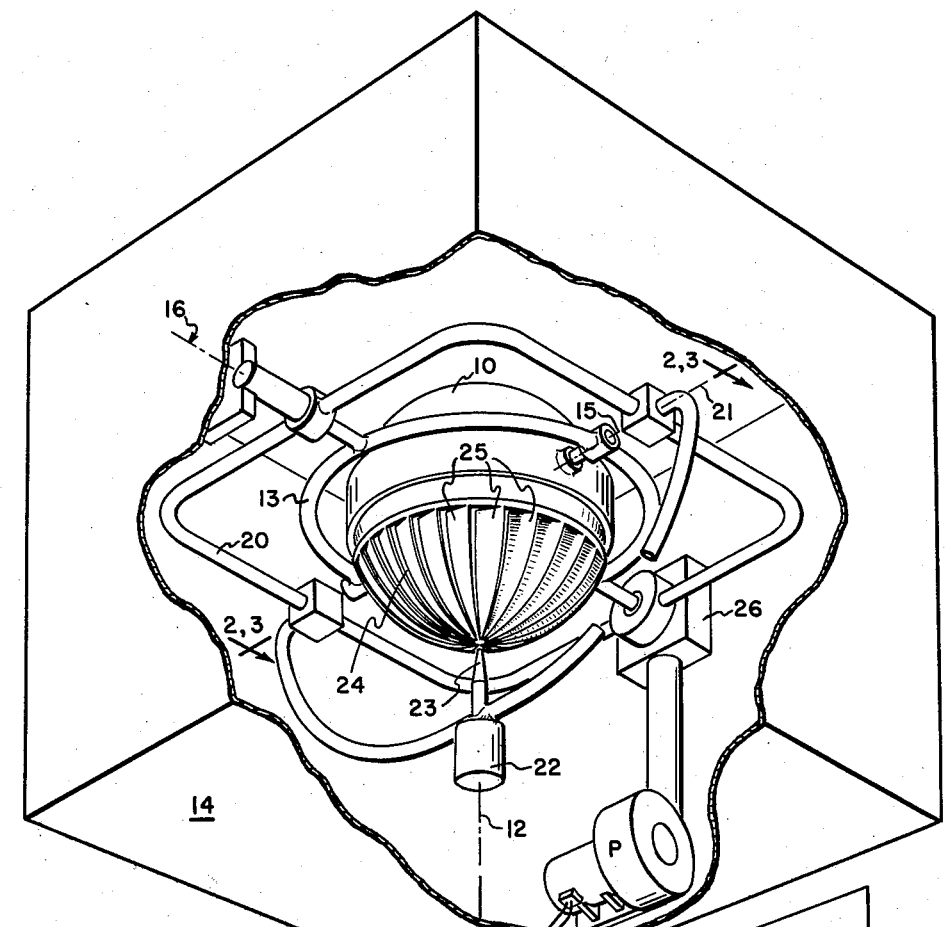
Fig. 1 is an isometric view, partly in section of a device incorporating the present invention.
Figure 2:
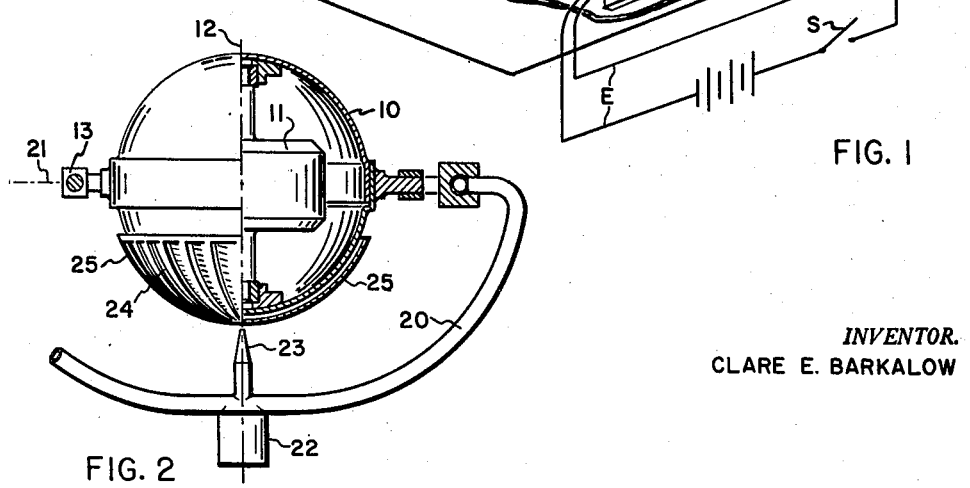
Fig. 2 is a fragmentary view, partly in cross-section, and taken along line 2—2 of Fig. 1.

The present invention may take physical form in a gyroscopic device which includes a case rotatably supporting a gyro wheel with its axis arranged in a vertical direction. This case is trunnioned in a gimbal which may in turn be trunnioned in one or more other gimbals in the manner commonly used in the art. The case is provided with blades symmetrically arranged thereon and about the spin axis of the gyro wheel. A nozzle is pendulously suspended to direct a jet stream in a vertical direction and in such manner that the jet stream will impinge against the blades on the outside of the case to vertically erect the spin axis.

The invention further includes the concept of mounting the gimbals and thus the gyroscopic device within a hermetically sealed housing which contains flowable material, such for example as gas, liquid or fluid which will be propelled through the nozzle and impinged against the blades. To accomplish this structure, a pump is provided within the housing with its inlet adapted to draw flowable contents or material from the housing and with its outlet adapted to be connected to the nozzle. Extreme accuracy is obtained when the pump is controlled from outside of the housing. The structure pendulously supporting the nozzle is hollow and forms a conduit from the outlet of the pump to the nozzle.

A specific example of a gyroscopic device and a vertical erection mechanism incorporating the features of the present invention has been illustrated in the drawings for better explaining the invention and not for the purpose of limiting the scope thereof. In this specific example there is illustrated a case 10 which may be hermetically sealed and which forms a gimbal supporting the gyro wheel 11 for rotation about a vertical spin axis 12. Since it is hermetically sealed, the gyro wheel, its shaft, bearings and other component parts are completely inclosed within the case 10. In this instance the case is trunnioned in a case supporting gimbal 13 which in turn is trunnioned in a housing 14 which may be hermetically sealed. The trunnion axis 15 of the case 10 is perpendicular to the spin axis 12 of the gyro 11 and to the trunnion axis 16 of the case supporting gimbal 13 in a manner well known in the art. Further, in this specific example, a pendulum supporting gimbal 20 is also trunnioned in the housing 14 with its trunnion axis 21 co-axial with the trunnion axis 16 of the case supporting gimbal 13. Pendulously supported from the pendulum supporting gimbal 20, and for pivotal movement on a pivot axis 21 perpendicular to the trunnion axis 16, is an erector 22 including a nozzle 23 located for directing a jet stream co-axially with the spin axis 12 of the gyro wheel and against the surface 24 of the case 10. Mounted on the surface of the case are blades 25 symmetrically arranged about the vertical spin axis 12 and formed into a somewhat spherical shape.

The blades are arranged in a symmetrical pattern with their inner ends merged with each other and with their outer ends spaced apart and forming the periphery of a circle. Each individual blade is of somewhat triangular shape and has opposite side edges. Although the corresponding side edges of all of the blades may be aligned in an imaginary contour surface of somewhat spherical shape, it is preferred that they form a spherical shape. When the inside edges of the blades lie against the outer surface of the case and that outer surface is spherical, maximum force from the jet in torquing directions against the case is obtained. The merged inner ends of the blades are positioned on the outside of the case and in line with the spin axis. Furthermore, the blades are set at a pitch angle so that any integral portion of the surface thereof is in a plane disposed at an angle to the spin axis. The blades may be stamped from a single sheet of material, if desired, or they may be integrally formed with the case.

Figure 3:
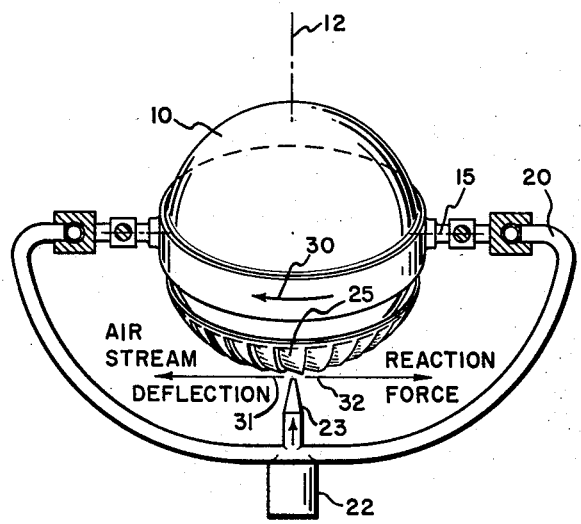
Fig. 3 is an illustration of the shell 10 having angular displacement.

Reference is now made to Fig. 3 for an operational description of the device. In this example, the shell 10 is angularly displaced about axis 15 such that axis 12 does not extend through the nozzle 23 and the gyro wheel is spinning in the direction indicated by the arrow 30. The object at this point is for the jet stream emitted by nozzle 23 to erect the shell 10 such that the axis 12 extends through the nozzle 23. The jet stream is obtained from or by means of a circuitry E controlled entirely from a position externally of the housing by means of a switch S or other suitable control devices. The flow of fluid or gas from the pump P to nozzle 23 is by way of a gas conductive trunnion support 26 on housing 14 and the hollow pendulum device 20 and 22. Operation of the pump P causes the fluid or gas from the housing to be impinged against the blades 25 in the form of a jet stream.

The jet stream is deflected in the direction as indicated by arrow 31 by the blades 25. Arrow 32 indicated the direction of the reaction force to the jet stream.

It can be seen now that the laws of precession would cause the reaction force to act upon the shell 10 in such a manner as to restore the gyro spin axis 12 to extend through the nozzle 23.

It is to be noted that other vector forces are obviously in effect which may cause some perturbations or spiraling but will not effect the final settling position of the shell 10.

Thus, if the gyro spin axis does not extend through the nozzle and the jet stream at the time the pump is starting, the jet stream will gradually urge the case to take a position in which the spin axis is in the jet stream. When the spin axis is in the jet stream, the jet stream impinges concentrically about the axis and on the merged edge of the symmetrical blades in such manner that forces exerted on the blades are symmetrically disposed with respect to the spin axis such that no precessing torque exists.

The case may be filled with any desirable fluid, gas or similar mass of any desired density and weight. However, to carry out the invention to the fullest degree, the case is filled with a gas, fluid or the like, of a density or weight lighter than that on the outside of the case and within the housing. In this way, the case is at least partially buoyant or at least partially floats in the gas or fluid in the housing. It is recognized that when gases or fluids in the housing have a high density, the forces of the jet stream impinging on the blades are higher than when the density is low. As a specific example, the case may be filled with helium and the housing with a gas, such for example, carbon dioxide which is heavier than air or other suitable gases or fluids which are heavier than air. Rare gases or fluids may be used in both instances since they are isolated from each other and maintained in complete captivity by the hermetically sealed case and housing.

Although the present invention has been described with a certain degree of particularity, it is understood that various modifications in the details and arrangement of parts may be had without departing from the spirit and scope of the invention as hereinafter claimed.

I claim:

1. A gyroscopic device comprising gimbals and a gyro wheel mounted in said gimbals for spinning about a normally vertical axis and for angular movement about two mutually perpendicular horizontal axes at right angles to the spin axis, substantially spherical means on the innermost of said gimbals co-axially aligned with said spin axis, said means comprising blades having their inner ends merging together at said axis and their outer ends spaced apart and aligned in a symmetrical pattern about said axis, nozzle means pendulously mounted on the outermost of said gimbals for directing a jet stream against said blades to maintain said rotor spin axis in a vertical position, and pumping means connected to said nozzle means to provide said jet stream for erecting the gyroscopic device.

2. A gyroscopic device comprising gimbals and a gyro wheel mounted in said gimbals for spinning about a normally vertical axis and for angular movement about two mutually perpendicular horizontal axes at right angles to the spin axis, substantially spherical means on the innermost of said gimbals co-axially aligned with said spin axis, said means comprising blades having their inner ends merging together at said axis and their outer ends spaced apart and aligned in a symmetrical pattern about said axis, each of said blades having its integral surface portions disposed in planes at an angle to said spin axis, pendulously mounted means for directing a jet stream against said blades to maintain said rotor spin axis in a vertical position, and pumping means connected to said nozzle means to provide said jet stream for erecting the gyroscopic device.

3. A gyroscopic device comprising gimbals and a gyro wheel mounted in said gimbals for spinning about a normal vertical axis and for angular movement about two mutually perpendicular horizontal axes at right angles to the spin axis, the outermost of said gimbals constituting a hermetically sealed housing, substantially spherical means on the innermost of said gimbals co-axially aligned with said spin axis, said means comprising blades having their inner ends merging together at said axis and their outer ends spaced apart and aligned in a symmetrical pattern about said axis, each of said blades having its integral surface portions disposed in planes at an angle to said spin axis, pendulously mounted means for directing a jet stream against said blades to maintain said rotor spin axis in a vertical position, and pumping means connected to said nozzle means to pump the contents of said housing through said nozzle to provide said jet stream for erecting the gyroscopic device.

4. A gyroscopic device comprising gimbals and a gyro wheel mounted in said gimbals for spinning about a normal vertical axis and for angular movement about two mutually perpendicular horizontal axes at right angles to the spin axis, the inner of said gimbals constituting a hermetically sealed case inclosing said gyro wheel and the outer of said gimbals constituting a hermetically sealed housing, substantially spherical means on said case co-axially aligned with said spin axis, said means comprising blades having their inner ends merging together at said axis and their outer ends spaced apart and aligned in a symmetrical pattern about said axis, each of said blades having its integral surface portions disposed in planes at an angle to said spin axis, pendulous means mounted within said housing for directing a jet stream against said blades to maintain said rotor spin axis in a vertical position, and pumping means within said housing and connected to said nozzle means to pump the contents of said housing through said nozzle to provide said jet stream for erecting the gyroscopic device.

5. In a gyroscopic device a hermetically sealed housing, a plurality of gimbals and a gyro wheel within said housing, the inner of said gimbals rotatably supporting said gyro wheel and constituting a hermetically sealed case inclosing said wheel, a gas within said housing and on the outside of said case, and pendulous means directing a jet stream of said gas against said case to exert torques on said case tending to urge movement of said spin axis.

6. The structure of claim 5 wherein said housing contains a flowable material and said case is at least partially buoyant therein.

7. In a gyroscopic device a housing, a plurality of gimbals and a gyro wheel within said housing, the inner of said gimbals rotatably supporting said gyro wheel and constituting a case inclosing said wheel, a gas within said housing and on the outside of said case, and pendulous means directing a jet stream of said gas against said case, said case having means on the outside thereof to direct said jet stream in a direction to exert torques on said case tending to urge movement of said spin axis.

8. A gyroscopic device comprising gimbals and a gyro wheel mounted in said gimbals for spinning about a normal vertical axis and for angular movement about two mutually perpendicular horizontal axes at right angles to the spin axis, the inner of said gimbals constituting a hermetically sealed case inclosing said gyro wheel and the outer of said gimbals constituting a hermetically sealed housing which contains a flowable material, said case being at least partially buoyant in said flowable material, substantially spherical means on said case co-axially aligned with said spin axis, said means comprising blades having their inner ends merging together at said axis and their outer ends spaced apart and aligned in a symmetrical pattern about said axis, each of said blades having its integral surface portions disposed in planes at an angle to said spin axis, pendulous means including nozzle means mounted within said housing for directing a jet stream against said blades to maintain said rotor spin axis in a vertical position, and pumping means within said housing and connected to said nozzle means to pump the contents of said housing through said nozzle means to provide said jet stream for erecting the gyroscopic device.

9. A gyroscopic device comprising gimbals and a gyro wheel mounted in said gimbals for spinning about a normal vertical axis and for angular movement about two mutually perpendicular horizontal axes at right angles to the spin axis, the inner of said gimbals constituting a hermetically sealed case inclosing said gyro wheel and the outer of said gimbals constituting a hermetically sealed housing, substantially spherical means on said case co-axially aligned with said spin axis, said means comprising blades having their inner ends merging together at said axis and their outer ends spaced apart and aligned in a symmetrical pattern about said axis, each of said blades having its integral surface portions disposed in planes at an angle to said spin axis, pendulous nozzle means mounted within said housing for directing a jet stream against said blades to maintain said rotor spin axis in a vertical position, pumping means within said housing and connected to said nozzle means to pump the contents of said housing through said nozzle means to provide said jet stream for erecting the gyroscopic device, and means positioned externally of said housing for controlling said pumping means.

References Cited in the file of this patent

UNITED STATES PATENTS

| | | |
|---|---|---|
| 2,225,568 | Iverneuer | Dec. 17, 1940 |
| 2,650,502 | Lundberg et al. | Sept. 1, 1953 |